(12) United States Patent
Mortensen et al.

(10) Patent No.: US 7,124,400 B2
(45) Date of Patent: Oct. 17, 2006

(54) EXTENSIBLE CUSTOMIZATION FRAMEWORK FOR A SOFTWARE SYSTEM

(75) Inventors: Douglas R. Mortensen, Columbus, OH (US); Patrick E. Plaisted, Rawson, OH (US); Michael J. Morel, Richfield, OH (US)

(73) Assignee: Microsoft Corporation, Redmond, WA (US)

( * ) Notice: Subject to any disclaimer, the term of this patent is extended or adjusted under 35 U.S.C. 154(b) by 633 days.

(21) Appl. No.: 10/389,683

(22) Filed: Mar. 12, 2003

(65) Prior Publication Data

US 2004/0181773 A1 Sep. 16, 2004

(51) Int. Cl.
*G06F 9/45* (2006.01)
(52) U.S. Cl. ...................................................... 717/121
(58) Field of Classification Search ................. 717/121
See application file for complete search history.

(56) References Cited

U.S. PATENT DOCUMENTS

| 5,936,860 | A | * | 8/1999 | Arnold et al. ................. 700/95 |
| 5,987,247 | A | * | 11/1999 | Lau ............................. 717/100 |
| 6,684,383 | B1 | * | 1/2004 | Natori et al. ................ 717/107 |
| 6,728,655 | B1 | * | 4/2004 | Stark ........................... 702/123 |
| 2004/0049609 | A1 | * | 3/2004 | Simonson et al. ............. 710/8 |
| 2004/0177339 | A1 | * | 9/2004 | Plaisted et al. .............. 717/116 |

\* cited by examiner

*Primary Examiner*—John Chavis
(74) *Attorney, Agent, or Firm*—Joseph R. Kelly; Westman, Champlin & Kelly, P.A.

(57) ABSTRACT

A customization framework includes a design component configured to receive a customization input, from a customizable subsystem, indicative of a customization. A runtime component receives a request from the customizable subsystem and identifies and customizes a portion of the customizable subsystem based on the request.

22 Claims, 14 Drawing Sheets

| CONFLICT RESOLUTION TABLE ||
|---|---|
| DATA TYPE | POLICY |
|  |  |

| Customer |
| Actions Tools Window Help |
| Summary | Addresses | Order Summary | Payment | Car Preferences | Service Information | Other |

*Mortens* / *Consoto*

Contact Summary
- ID:
- Name:
- Key Contact:
- Main Phone:
- Main Address:

*Mortens* / *Consoto*

Order Summary
- #Open Orders:
- $ Open Orders:
- $ Spend YTD:

Service Summary
- Preferred Technician:
- Service Notification:
- Type of Notification:

This is the same screen and customer entity with multiple customizations from multiple organizations!

EXTENSIBLE CUSTOMIZATION FRAMEWORK FOR A SOFTWARE SYSTEM

BACKGROUND OF THE INVENTION

The present invention relates to a computing environment in which source code is used to implement applications and programs desired by a user. More specifically, the present invention relates to a framework which enables customization of the computer programs or applications without modifying the source code.

One approach to designing and marketing computer software-related products is to focus on horizontal functionality such that the product is broadly applicable across large industry segments, and across many different countries. Such a system may also desirably promote an aftermarket to meet the unique needs of specific vertical target markets and specific companies. Similarly, the product may desirably promote a customer's ability to change or customize the product to their individual needs.

If the product cannot be extended to meet the unique needs of a customer, it essentially requires a customer to change its business to match the software which the customer has just purchased. Of course, these types of systems are resisted by customers, since changes to business activities can be costly and time consuming.

There are a number of different techniques which have been conventionally used in order to enable a system to be customized. Such conventional techniques include, for example, source code modification. This technique entails providing customers with copies of the source code for the product. It thus allows a well trained practitioner to change significant amounts of content, and those changes can be made to look as if they are part of the product, because in effect, they are part of the modified source code product.

However, source code modification carries with it significant drawbacks. For example, source code modification costs a significant amount of money prior to using the product, because the user or customer must often hire expensive consultants and developers who have been specifically trained in the nuances of how the product is built. The user must then endure the risk of estimating a problem, which is a very difficult and imprecise task. Even if these problems can be overcome and persevered, the result is modified source code. When the manufacturer of the original source code ships additional software, such as bug fixes, updates, and new versions, the customer is either forced to again hire talented engineers or developers (and hopefully the same ones who made the original modifications), in order to merge those modifications into the new source code shipped by the manufacturer, and to resolve issues, one-by-one, as they arise in the newly modified source code. Alternatively, the user can simply go without the bug fixes and new features that may benefit the user's business.

In addition, source code modification makes it extremely difficult to simply purchase add-on modules "off the shelf" from multiple different vendors, because each of those vendors will likely have to modify the source code as well to accommodate their specific off the shelf modules. Consequently, not only must the manufacturer ship the source code of the base product, but each add-on vendor must ship their source as well. The user must then conduct some sort of adhoc merge process or synthesize a single product out of these random sets of source code. Of course, this results in a brittle set of code that is virtually guaranteed to have problems with upgrades or when any one of the vendors ships a bug fix.

Source code modification also suffers from the problem that only one organization in the world (the specific developers or engineers who modified the source code) knows how the modified source code product was built. Therefore, it is difficult, if not impossible, to achieve economies of scale and product support for any of the products running at the customer site.

The problems with source code modification increase significantly when, even within a single customer, there exists a diverse set of users with a diverse set of needs and preferences. Every time one of those users changes the product through the source code modification strategy in order to accommodate their particular needs, the customer employing those users, in effect, ends up with a new source code base. In other words, the customer does not only have a single custom code base, but it may actually have many custom code bases, depending upon how many specific users or departments within the customer have modified the code base. Again, each time a bug fix is published or a change is made to a customization that applies to all users, the customer must go through some sort of merge process with all other copies of the source which have been made.

This is only a partial list of the many problems associated with source code modification techniques. These problems can result in a great deal of difficulty for the management of the customer, and the employees themselves.

Another technique which enables some limited modification of a computer program that is based on objects includes the addition of user fields which can be defined by the user. In other words, each object which is to be "customizable" is initially defined to have one or more user fields which can be defined or used by the user, as the user wishes. While this does allow some type of customization, it does not solve all the problems mentioned above. It also carries with it a large number of its own problems. For example, the naming convention associated with the user fields makes it non-intuitive and difficult to associate the specific uses of those user fields. For instances, the additional user fields are typically named with very general names such as "USERFIELD.1" to "USERFIELD.N" It is difficult, if not impossible, for the users to remember what each user field has been used for. In addition, the additional user fields do not solve problems associated with multi-vendors or multiple modifications by different organizations. For example, if one vendor or one user assigns the user fields in a first way, but another vendor or user assigns the same user fields in a different way, then there is inconsistency in how the user fields are defined, and the two products associated with the two vendors or users will not work together without even further modification.

Other techniques for customizing have been tried as well. For example, customizations can be made by writing custom event code. Then, by using a one-to-one mapping to the original objection in the source code, the "customized" object can be manipulated when an event occurs on the original object. Another technique previously used is to include "property bags" or name-value pairs. Both of these techniques also have significant drawbacks and do not remedy the deficiencies associated with source code modification.

SUMMARY OF THE INVENTION

A customization framework includes a design component configured to receive a customization input, from a customizable subsystem, indicative of a customization. A runtime component receives a request from the customizable subsystem and identifies and customizes a portion of the customizable subsystem based on the request.

BRIEF DESCRIPTION OF THE DRAWINGS

FIGS. 8A–8C are screen shots illustrating one example of a customization of a system screen in accordance with one embodiment of the present invention.

DETAILED DESCRIPTION OF ILLUSTRATIVE EMBODIMENTS

The present invention relates to customization of computer software. However, prior to discussing the present invention in greater detail, one embodiment of an illustrative environment in which the present invention can be used will be discussed.

Figure 1:
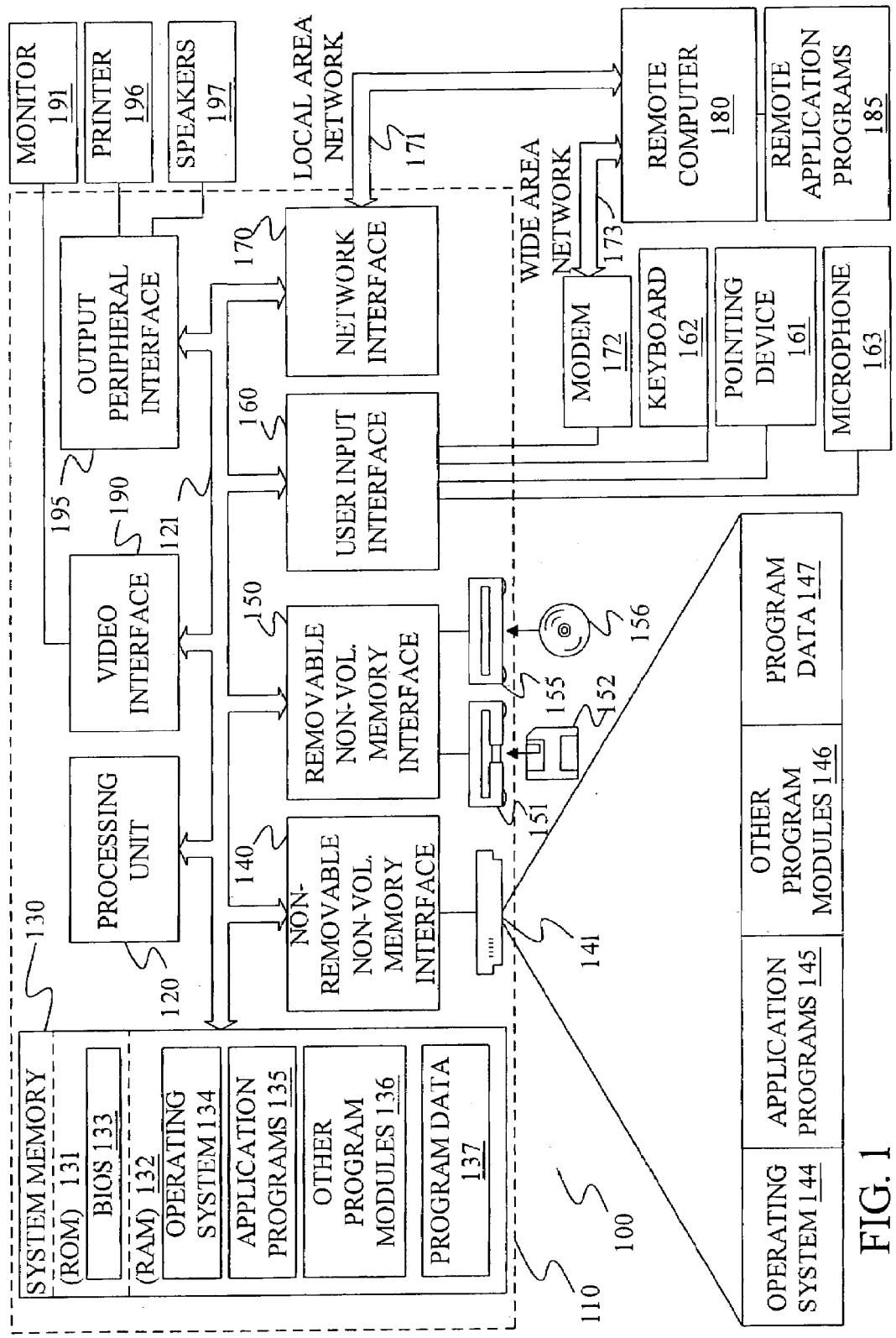
FIG. 1 is a block diagram of one environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
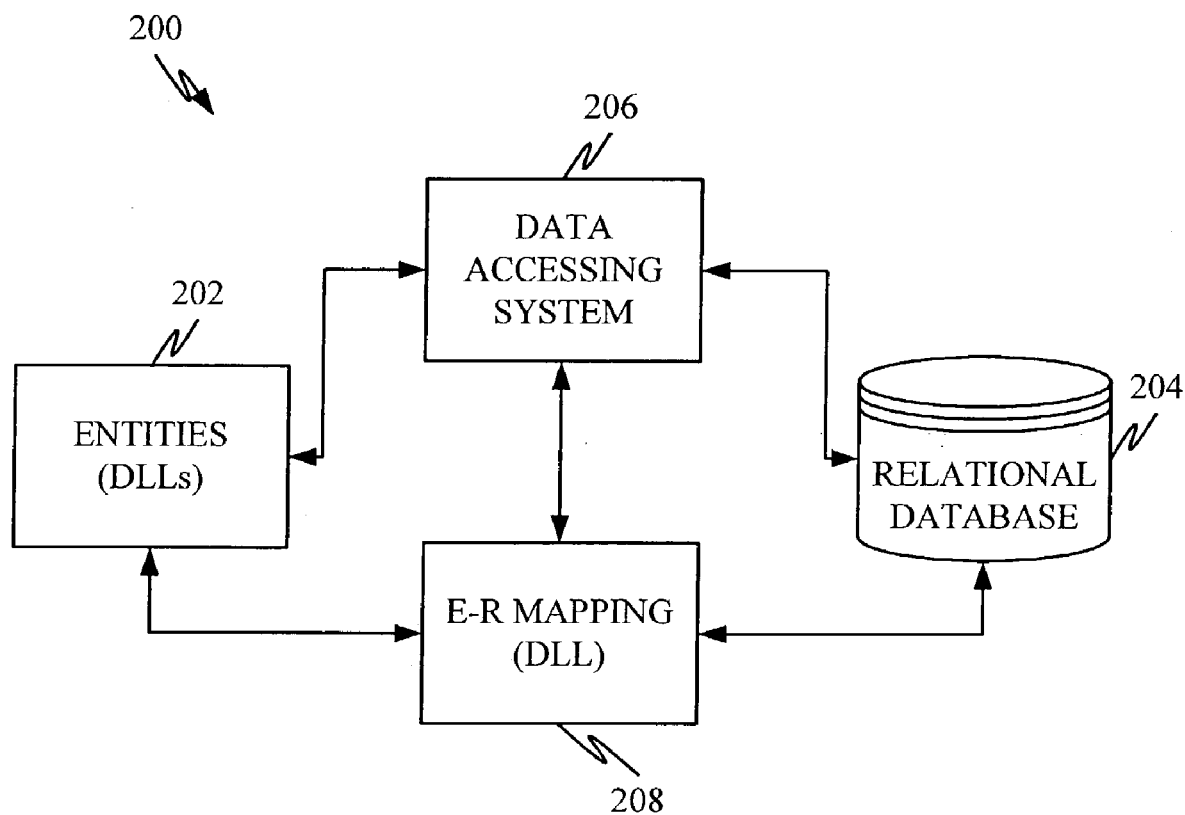
FIG. 2 is a block diagram of an object-relational (or entity-relational) database system.

FIG. 2 is a block diagram of an object-relational (or entity-relational) data storage system. In the present discussion, entities will be referred to in a manner that is interchangeable with the term "objects". E-R system 200 includes a set of entities (or objects) 202 which correspond to data stored in a relational database 204. The entities access relational data through data accessing system 206 which utilizes entity-relational (ER) map 208. ER map 208 contains a mapping between the entities 202 and the table entries in relational database 204. It should be noted that the present invention can be used in other systems, other than E-R systems, and the system shown in FIG. 2 is but one example of a system in which the present invention can be used.

Figure 3:
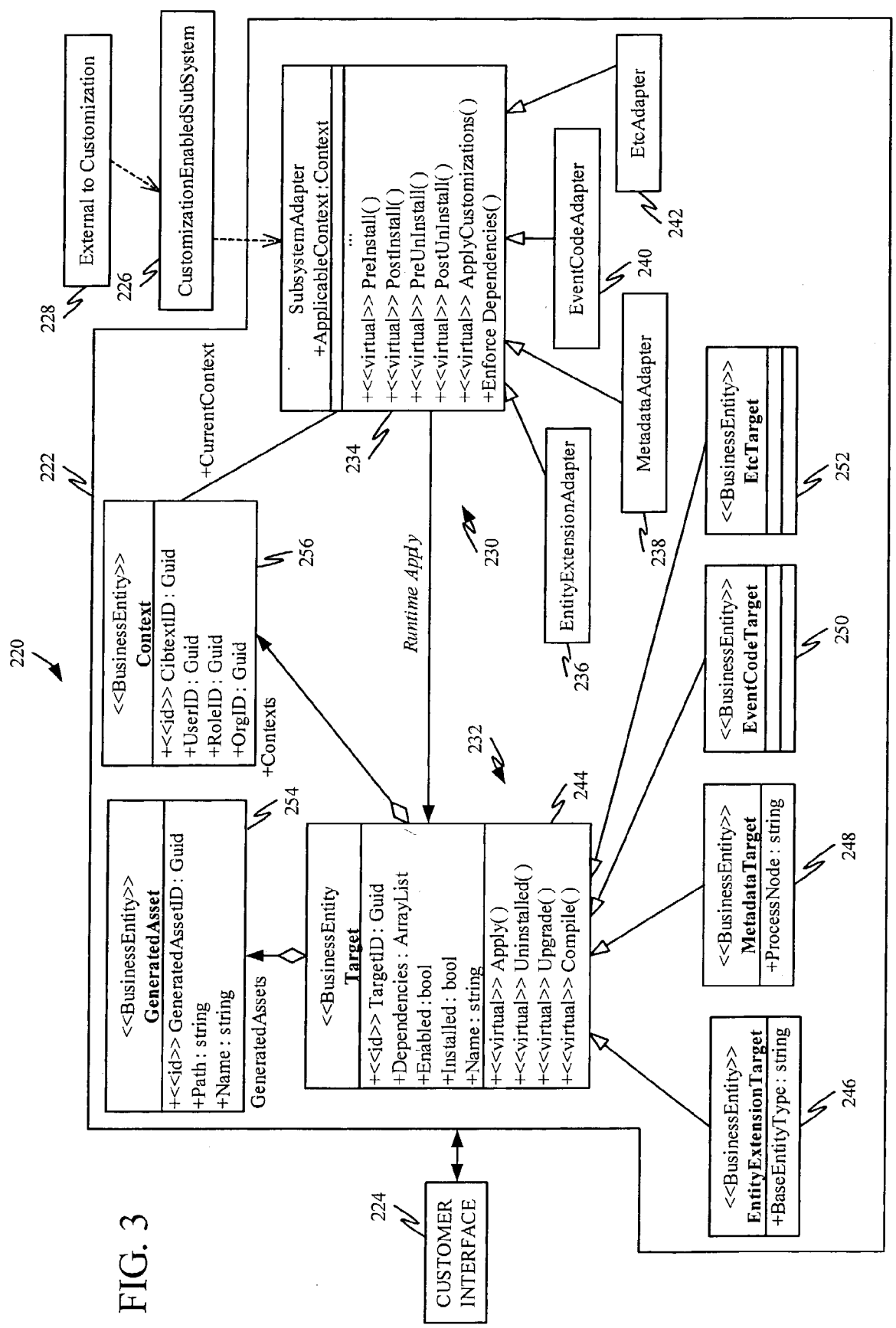
FIG. 3 is a UML class diagram of a customization framework in accordance with one embodiment of the present invention.

FIG. 3 is a unified modeling language (UML) class diagram of a customization framework 220 for a customization subsystem 222 in accordance with one embodiment of the present invention. Customization subsystem 222 is shown connected to a customizer user interface 224 which provides interaction between a customizer (such as a developer, user or intermediate customizer—e.g., a manager) and customization subsystem 222. Subsystem 222 is also shown connected to a customization-enabled subsystem 226 which is, in turn, connected to a component 228 that is external to the customization features of the present invention.

Customizer interface 224 allows a customizer to access system 222 to make customizations to computer software, as will be discussed in greater detail below. The external component 228, can be any component, such as a user, which desires to access some of the customized software. Customization-enabled subsystem 226 is any subsystem in the computing environment used by the user, which is configured to interact with the customization system 222 such that it can be customized.

Customization subsystem 222 includes an adapter system 230 and a target system 232. Adapter system 230 is implemented with a base class SubsystemAdapter 234 and a plurality of data type adapters 236, 238, 240 and 242. Target system 232 is implemented through a base class Target 244 and a plurality of data type targets 246, 248, 250 and 252. Target system 232 is also in a composition relationship relative to a GeneratedAsset entity 254. Both systems 230 and 232 have access to Context entity 256.

Adapter system 230 operates as the primary connection point between customization-enabled subsystems 226 and framework 220. Adapter system 230 implements customization logic that applies to the subsystem 226 as a whole. Target system 232, on the other hand, contains logic which is used to customize specific instances of data types for which customization is desired.

Context entity 256 contains context information which identifies a current context. For example, it may be desirable to have customizations apply differently to people who play different roles at an organization. Similarly, it may be desirable for customizations to apply differently to different departments within an organization. Context entity 256 contains information which identifies a current context such that the customization associated with, and appropriate for, that context can be made. This is also discussed in greater detail below with respect to FIG. 4.

As is described below, framework 220 is extensible. For a subsystem to become customization-enabled, it must simply support the interfaces to framework 220. To the extent that the subsystem has additional data types for customization, the only steps which must be taken are to provide an adapter (such as adapter 242) for the data types for which customization is desired. Similarly, the author of the subsystem must author a target (such as target entity 252). Together, the adapter and target entities have customization logic for customizing the subsystem as desired by the author of the subsystem. It will also be appreciated that such a subsystem can create additional customizer interfaces 224 through which users can create customizations of the subsystem's type.

In accordance with one embodiment of the present invention, software that may need to be customized includes several basic classes of content, which includes user interface content, data and process content. User interface content includes content that a user sees on a screen or report. It may contain such things as layout information, messages, field labels, etc. Data represents information that the system stores. For example, data includes customers, inventory items, orders, etc. Process content includes work flow specifications that route work through a defined set of steps, as well as lower level processing logic that executes well defined actions on a piece of data. An example of process content may include, for example, the work flow and lower level processing logic that posts an order to a ledger or reserves an inventory item. These types of content, as well as other types, can be customized in accordance with various embodiments of the present invention.

Regardless of the type of content to be customized, customizations may desirably be associated with a given context. Context governs when the customization is relevant. That is, the notion of a context allows some customization to only apply to a specific user, whereas other customizations apply to a whole set of users who belong to a specific group, and still other customizations apply to an entire company, without regard to users. These are but three different examples of context, and many others can be used as well.

Figure 4:
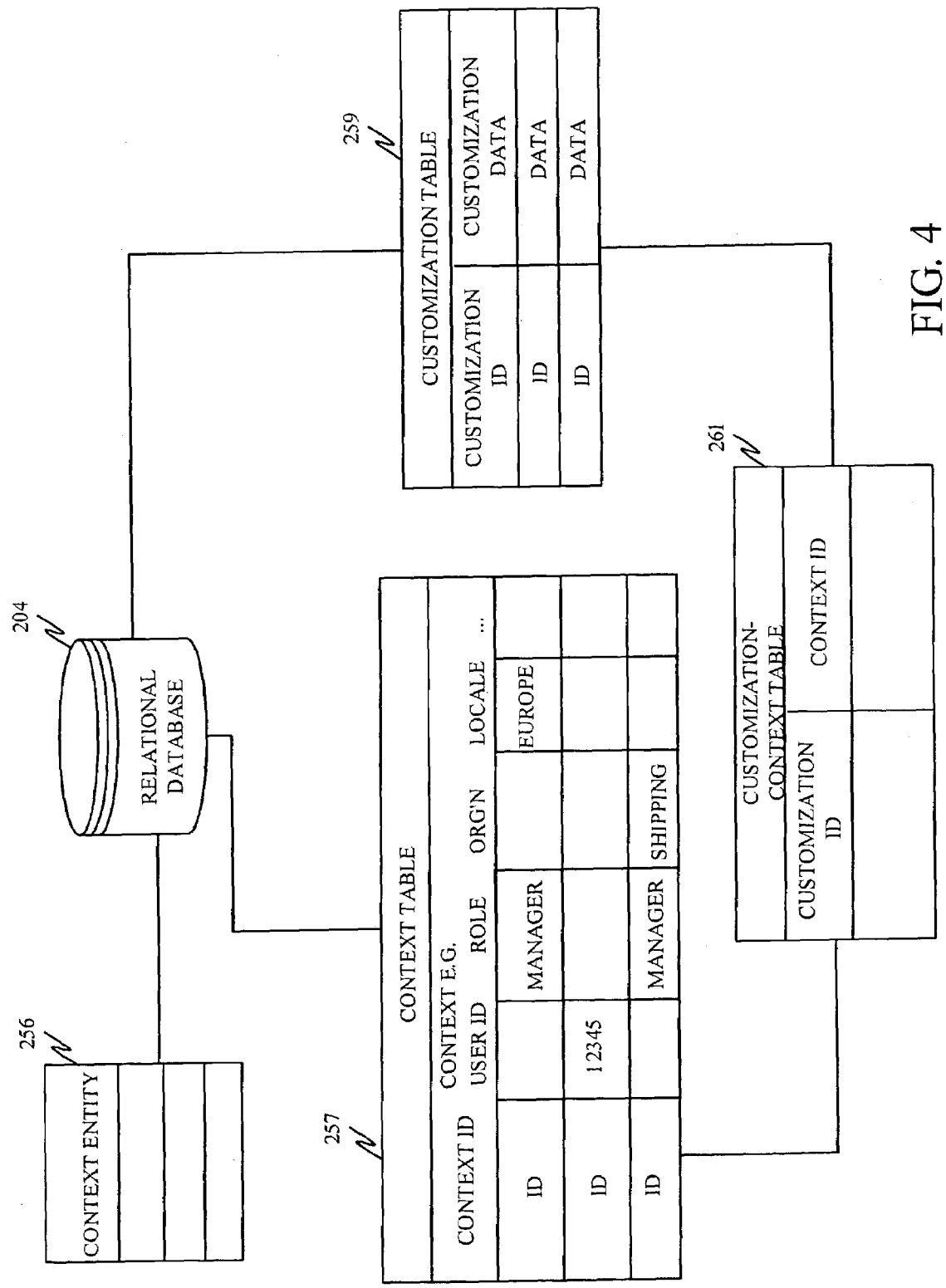
FIG. 4 is a block diagram illustrating one embodiment of maintaining context in accordance with the present invention.

Context entity 256 can be called by either adapter system 230 or target system 232 to obtain a current context. FIG. 4 illustrates one embodiment of the data structures represented by context entity 256. Of course, the context entity 256 represents data that is mapped into relational database 204. FIG. 4 illustrates one embodiment of tables which are used to identify which customizations apply to which context.

In the embodiment illustrated, context entity 256 maps to tables in relational database 204 that include a context table 257, a customization table 259 and a customization-context table 261. In the embodiment illustrated in FIG. 4, context table 257 includes fields that identify a context by a context identification number. Context table 257 shows four items of context including a user ID which identifies a specific user; a role which identifies a role within an organization, such as a manager, a sales person, a Vice President, etc.; an organization which identifies a business unit of a company, such as the shipping department, the sales department, etc.; and a locale which represents a geographic location. Of course, a wide variety of additional context elements can be used as well.

The first context entry in context table 257 indicates that the first context ID is associated with all managers in Europe. The second context ID is associated with a specific user having a user ID 12345, and the third context ID is associated with managers in the shipping department. The customization table 259 includes an identifier associated with the different customizations that have been entered into the system, as well as the customization data that specifies the particular customization associated with that customization ID. The customization-context table 261 maps between context IDs and customization IDs. Therefore, customizations having the specified ID are applied to the various contexts identified in the associated context ID field. Of course, multiple contexts can be mapped to any given customization, and multiple customizations can be mapped to any given context.

Also, other table configurations can be used, and that shown in FIG. 4 is but one example. For instance, table 261 can be eliminated and context table 257 can be provided with a customization ID field as well. There can still be many contexts for a single customization by having multiple rows in the context table.

In any case, systems 230 and 232 can request the current context from context entity 256 which can, in one embodiment, also return the identification of the particular customizations which need to be applied in the current context.

Entity Extension

Figure 5:
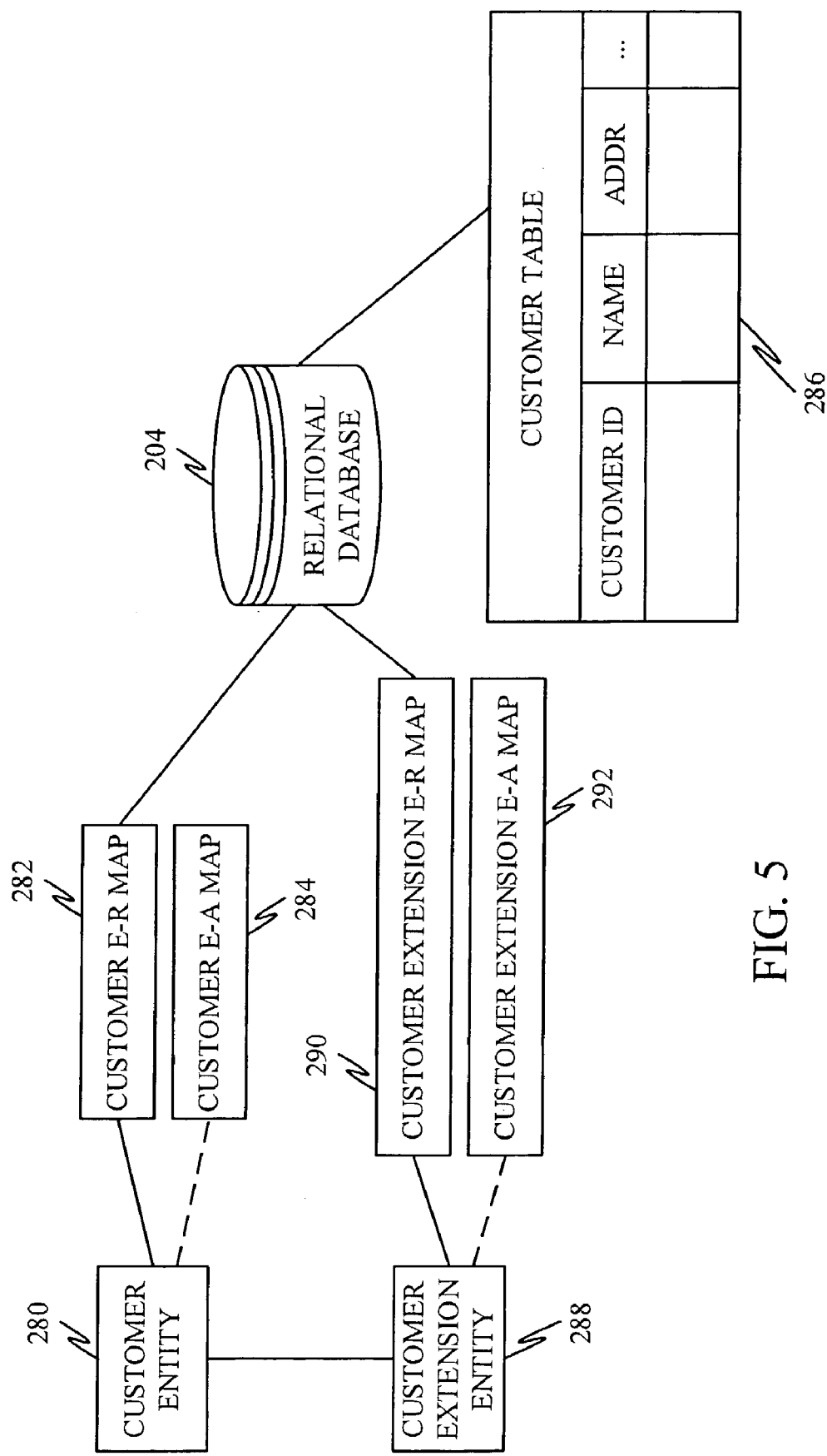
FIG. 5 illustrates an entity extension system in accordance with one embodiment of the present invention.
Figure 6A:
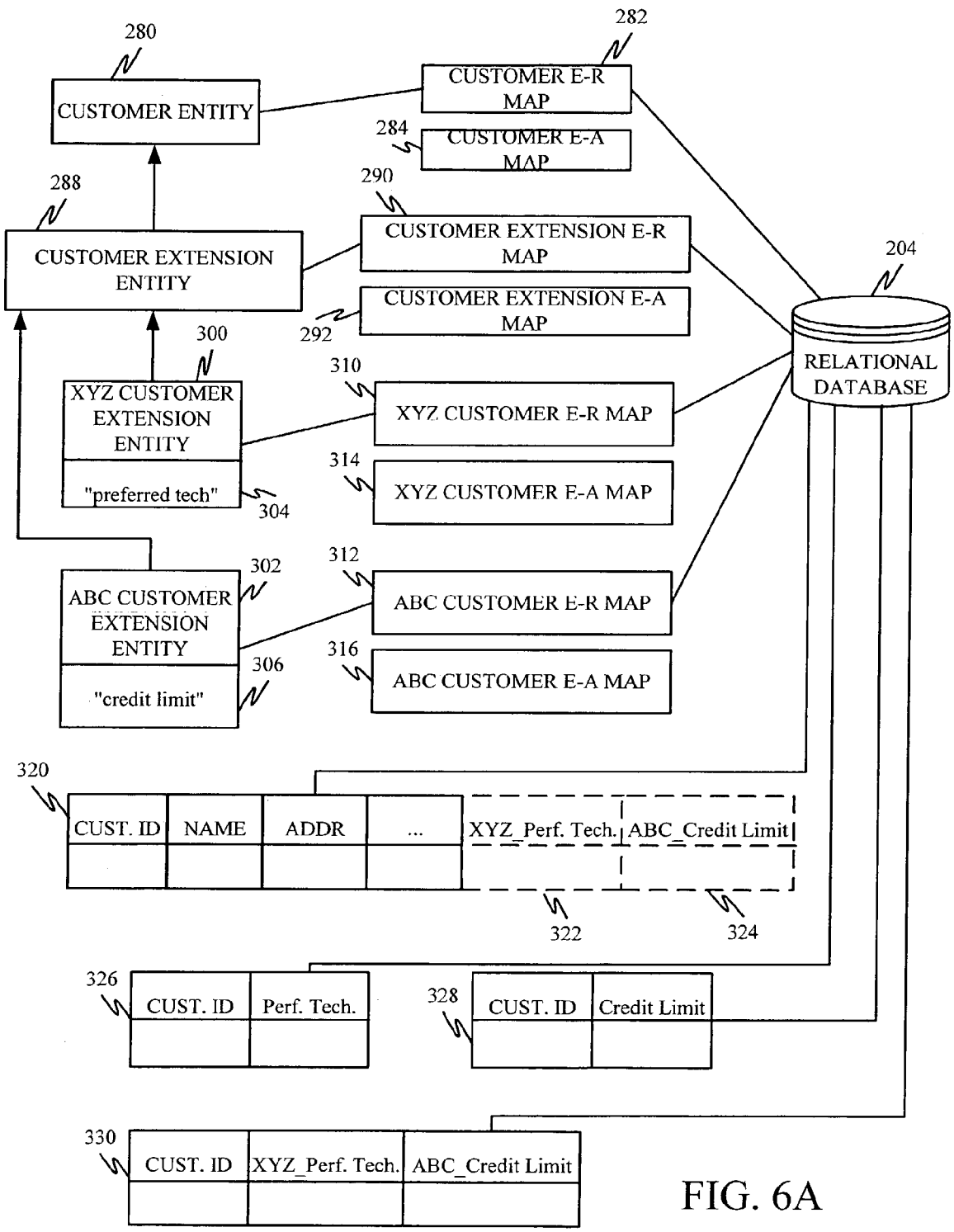
FIG. 6A illustrates the entity extension system shown in FIG. 5, after entities have been customized, or extended, in accordance with one embodiment of the present invention.
Figure 6B:
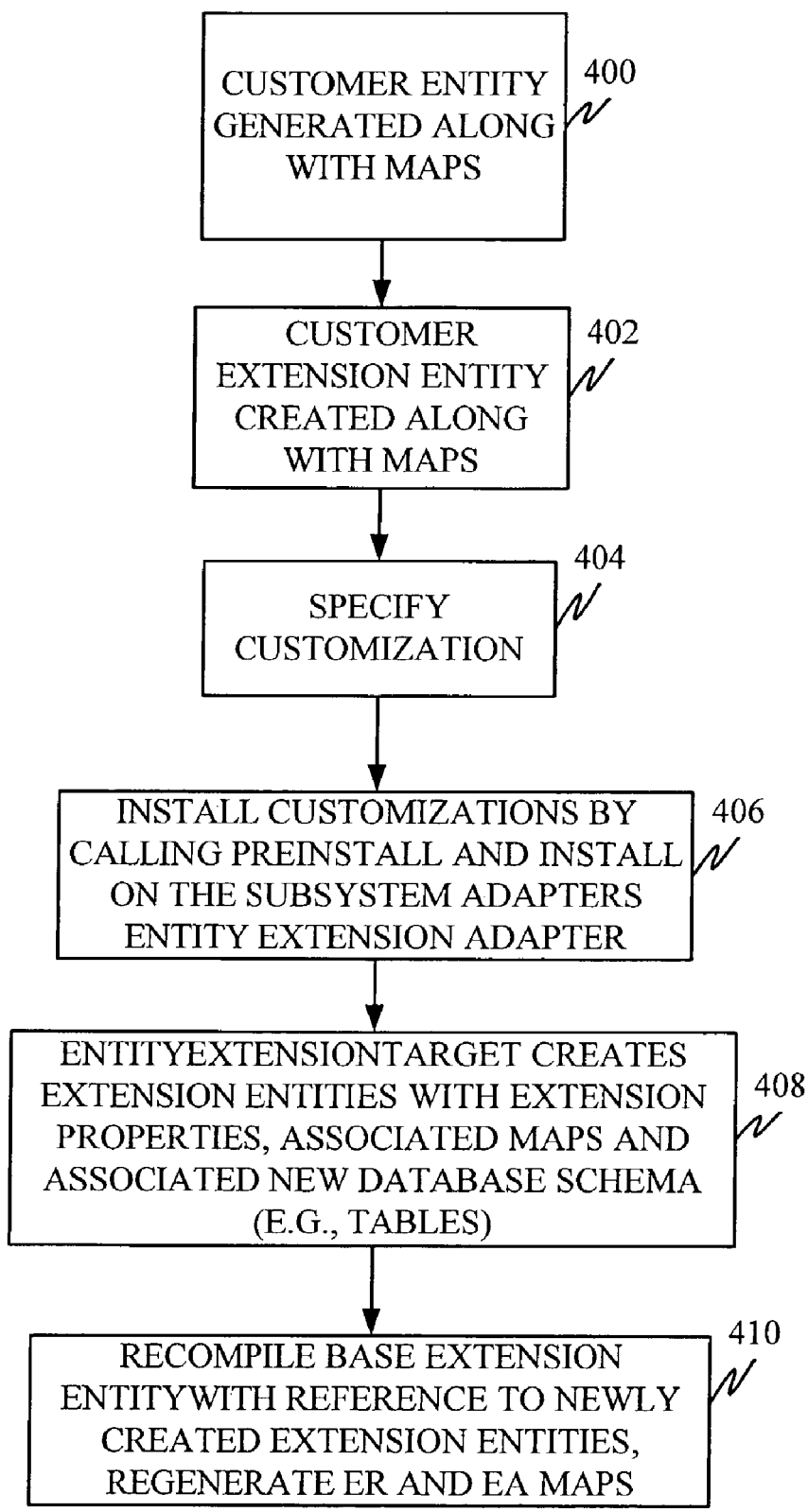
FIG. 6B is a flow diagram illustrating how entities are extended in accordance with one embodiment of the present invention.

In order to better illustrate the operation of the customization framework 220, the discussion will now proceed with respect to FIG. 3 in conjunctions with FIGS. 5–6B. These Figures better illustrate customization of entities. This is also referred to herein as "entity extension".

FIG. 5 illustrates data structures that are created when an entity in a customization-enabled subsystem is created. FIG. 6A illustrates the data structures that are shown in FIG. 5, in addition to data structures that are created, or modified, when an entity is customized. FIG. 6B is a flow diagram of how the entities in FIG. 6A are created or modified.

FIG. 5 shows a base entity 280 in a business application. The exemplary business entity 280 is a "customer" entity that identifies a customer in a business application. It will of course be appreciated that the specific examples illustrated are only examples and that the inventive concepts apply to other entities as well. Base entity 280 represents the entity being extended (or customized). FIG. 5 also illustrates that base entity 280 is mapped to relational database 204 by the customer ER map entry 282 in ER map 208 (shown in FIG. 2). A relationship between base entity 280 and other entities is identified in customer EA (entity association) map 284. FIG. 5 further illustrates that relational database 204 illustratively includes a customer table 286 associated with customer entity 280 that includes a customer ID field, a name field, an address field, and any other fields desired for identifying a customer.

Since the present invention does not require source code modification in order to customize entities, base extension entity 288 is also provided to enable the dynamic addition of new entity relationships to the base entity without recompilation of the base entity 280. A base extension entity 288 is created for each base entity 280 that is created. Base extension entity 288 illustratively includes the name of the base entity 280 such that, in the present example, base extension entity 288 is named "CustomerExtension". Base extension entity 288 is initially empty but can include a customer extension E-R map 290 and a customer extension EA map 292 which will also be empty. Base entity 280 contains a composition field that identifies the base extension entity. For instance, base entity 280 can include a composition field named "Extension" of the type "CustomerExtension". Entity association metadata for the Customer entity 280 reflects a relationship with the CustomerExtension entity 288. Both entities 280 and 288 are illustratively shipped and deployed as DLLs when the product in accordance with the present invention is installed. Generation of these entities and the associated maps is indicated by blocks 400 and 402 in FIG. 6B. At that point, a customizer can begin adding extension properties to the Customer entity 280 through a customizer user interface, such as interface 224 shown in FIG. 3.

FIG. 6A illustrates how the extension properties will be added. Customizer interface 224 includes a user interface (UI) that calls into framework 220 with a list of new properties to be added to an identified entity. The specification of the new properties to be added is passed into entity extension target 246 where it is stored. The customizer can also identify the particular context that is stored in context entity 256 for which the particular customization is to be applied. Specifying the customization is indicated by block 404 in FIG. 6B. It will also be appreciated that the context can be set at different times by different customizers. If the customizer is a developer, context can be set at the time of development. If the customizer is an administrator, context can be set as part of an administrator's function. In any case, the context is eventually set.

In order to make the customization active, subsystem 226 first calls the PreInstall( )method on subsystem adapter 234 to perform any processes required for subsystem 226, as a whole, prior to installation. The subsystem 226 then invokes the ApplyCustomizations( ) method on EntityExtensionAdapter 236. In response, EntityExtensionAdapter 236 then uses data accessing system 206 (shown in FIG. 1) to identify the EntityExtensionTarget instance 246 that contains the customized properties. EntityExtensionAdapter 236 then calls Install( ) on the particular EntityExtensionTarget 246. This is indicated by block 406 in FIG. 6B

This causes EntityExtensionTarget 246 to create a new entity which is referred to as an ExtensionEntity. Two ExtensionEntities 300 and 302 are illustrated in FIG. 6A. Each ExtensionEntity 300 and 302 includes at least one Extension property 304 and 306, respectively, that identifies the customized property. FIG. 6A illustrates an embodiment in which customizations have been made by two different customizers, labeled customizer XYZ and customizer ABC. Therefore, ExtensionEntity 300 is illustratively named XYZ.CustomerExtension and ExtensionEntity 302 is illustratively named ABC.CustomerExtension.

By way of example, assume that customizer XYZ desired to customize the customer entity 280 to include an identification of a technician which was preferred by the customer identified by entity 280. In that case, XYZ.CustomerExtension entity 300 includes Extension property 304 referred to as the "preferred technician property". Similarly, assume that customizer ABC desired to customize the customer entity 280 to include a credit limit associated with the customer identified by entity 280. In that case, ABC.CustomerExtension entity 203 includes Extension property 306 which identifies a "credit limit" associated with the given customer.

Not only does EntityExtensionTarget 246 create the ExtensionEntities 300 and 302, with their corresponding Extension properties 304 and 306, but it also illustratively creates E-R maps 310 and 312 and E-A maps 314 and 316, respectively, corresponding to each of the ExtensionEntities 300 and 302. In addition, EntityExtensionTarget 246 creates a table in relational database 204 (such as through data accessing system 206) that corresponds to the ExtensionEntities 300 and 302 and the other associated data structures. This is indicated by block 408 in FIG. 6B.

Finally, base ExtensionEntity 288 is recompiled and its E-R map is regenerated to reflect the new relationship with the ExtensionEntities 300 and 302. Similarly, E-A metadata is generated to reflect the new relationship with the ExtensionEntities as well. This is indicated by block 410 in FIG. 6B. This can be done, for example, by calling the PostInstall( ) method on the EntityExtensionAdapter class. In this way, the recompilation includes both changes from ABC and XYZ. This could also be done on install of a given target but would require the entity to be re-compiled n times, once for each target.

FIG. 6A also illustrates a plurality of different exemplary ways in which the database schema can be implemented to reflect the entity extensions made. In a first embodiment, the entity extensions are stored in the table illustrated as 320 in FIG. 6A. It can be seen that table 320 includes the original table 286 that stores data associated with customer entity 280. The original table is simply extended to include a plurality of additional fields 322 and 324 which correspond to the entity extensions. To avoid name clashes, the names are preceded by the namespace of the author to ensure uniqueness. Thus, the original columns in table 286 are unmodified. Extensions are simply added to the original table which correspond to the entity extensions.

In a second embodiment, each of the entity extensions is stored in its own table. Those tables are indicated by numerals 326 and 328, respectively. Of course, a different table can be created for each customization, or all customizations for a given customizer (ABC or XYZ) can be stored in a single table.

In accordance with a third embodiment, the customizations are both stored in a single table 330. In table 330, both the entity extensions "preferred technician" and "credit limit" are stored in table 330. In this embodiment, the column names are preceded with the namespace of the author to ensure uniqueness. Of course, table 330 could be enlarged to include all customizations for all entities, or all customizations for a single entity. In the latter case, a new table is created for each entity, that holds all customizations for that entity.

In accordance with yet another embodiment, the present invention can be used with a system in which one or more tables containing customizations have already been created, and thus already exist in relational database 204. In that embodiment, the ExtensionEntities 300 and 302 are simply mapped to the already-existing tables that contain the customizations.

Figure 6C:
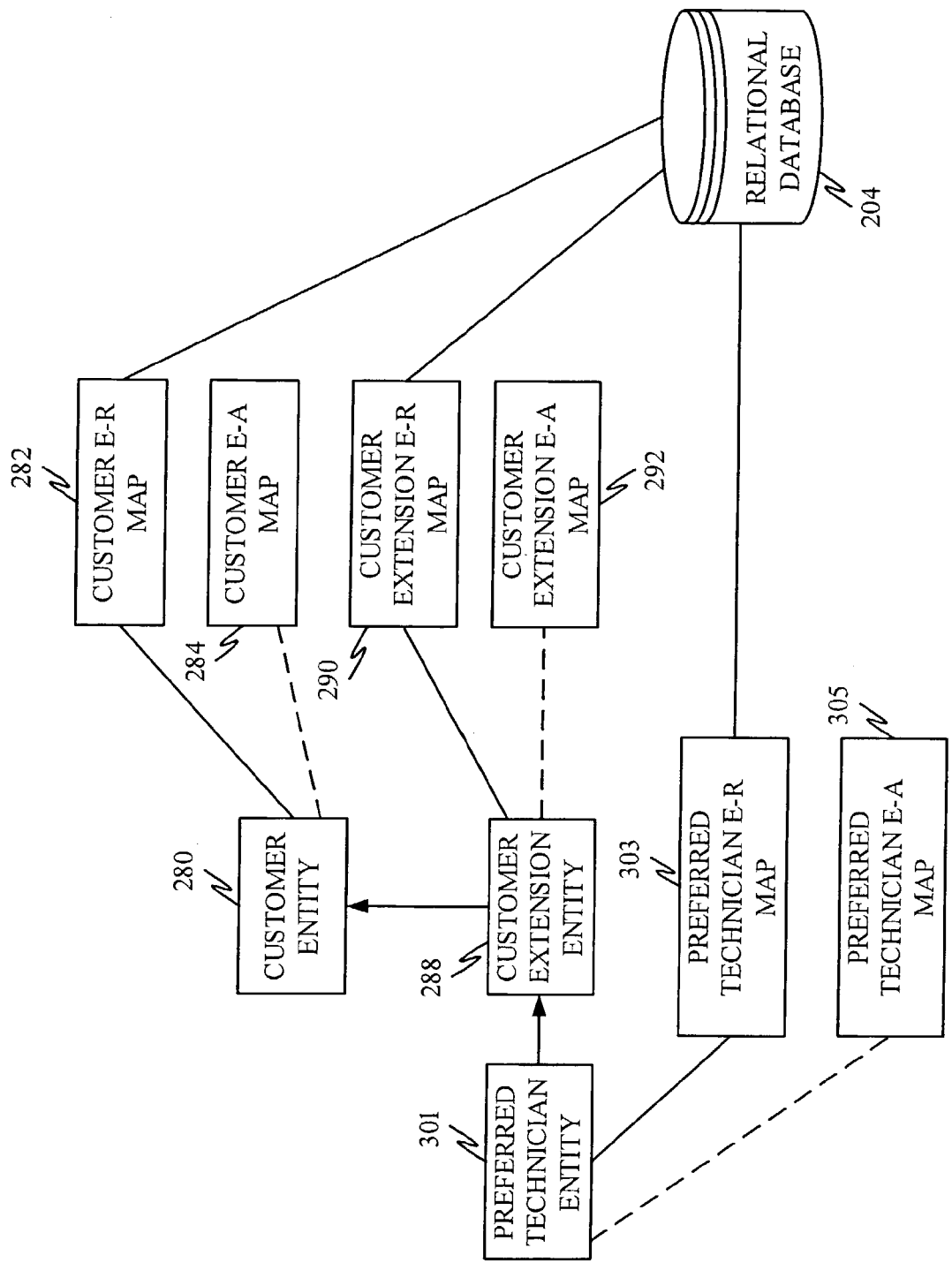
FIG. 6C is a block diagram illustrating how entities are customized by changing relations among entities in accordance with one embodiment of the present invention.

Entity extension can also be used to customize relationships among entities, and this is illustrated in FIG. 6C. FIG. 6C shows an embodiment in which a customizer did not write the "Preferred Technician" customization as a string name in a simple field, but instead authored it as another entity 301 with associated maps 303 and 305. In that case, customization takes place by adding an EA metadata relationship between the CustomerExtension entity 288 and the Preferred Technician entity 301 in the corresponding EA maps.

Metadata Customization

Figures 7A, 7B:
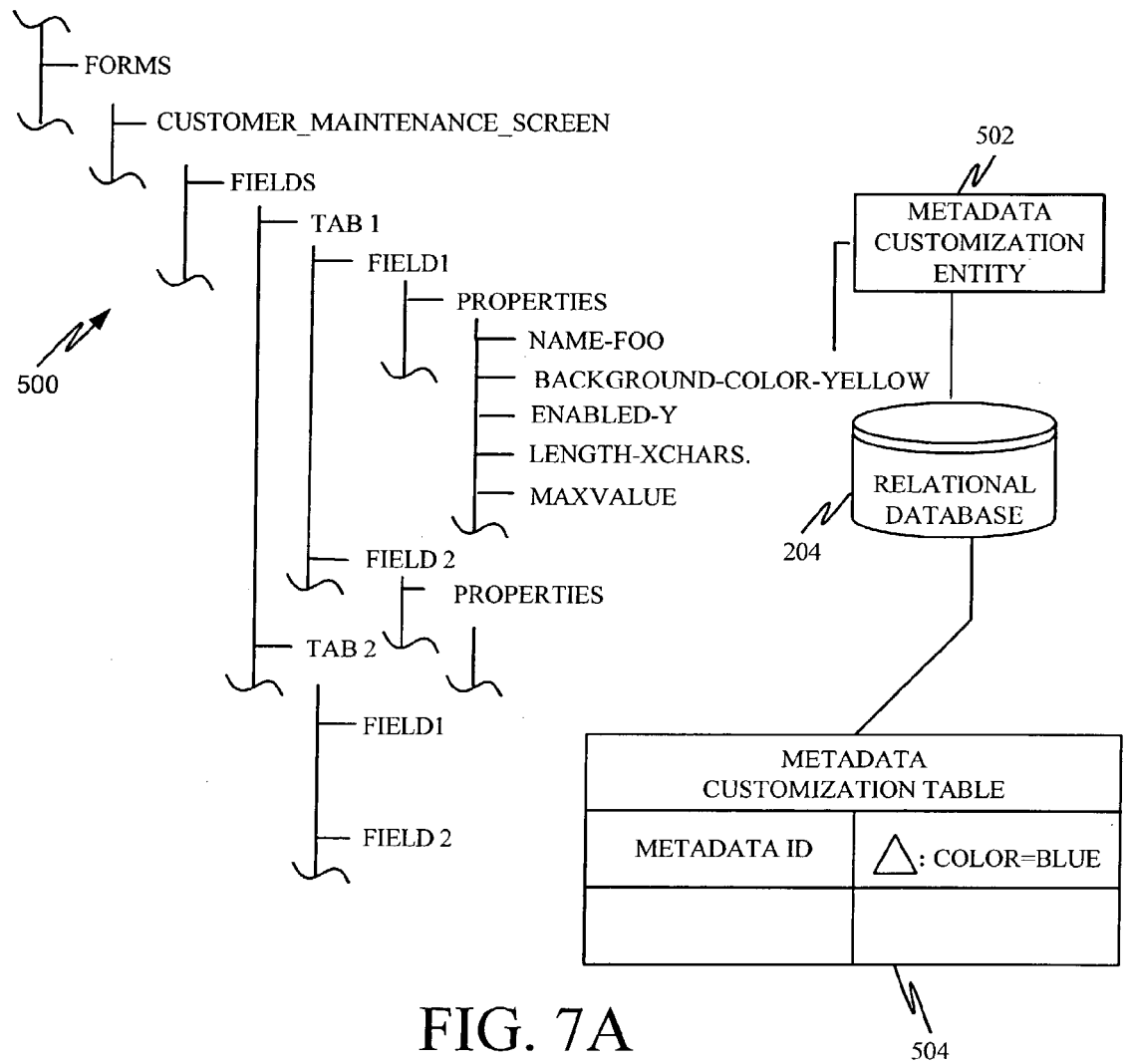
FIG. 7A illustrates one embodiment of a metadata structure and customizations in accordance with one embodiment of the present invention.
FIG. 7B illustrates one embodiment of a conflict resolution table.

FIG. 7A illustrates a metadata structure and metadata customization referred to herein as "delta-based customization". The metadata structure in FIG. 7A is illustrated by a portion of a metadata structure tree 500. It will be appreciated that the portion of tree 500 shown in FIG. 7A is illustratively but a very small portion of a much larger tree that defines metadata for the system. The portion shown in FIG. 7A illustrates that the metadata includes a Form section which itself includes a Customer_Maintenance_Screen. The Customer_Maintenance_Screen includes fields which have a plurality of Tab controls. Tab control 1 has a Field 1 associated with it. Field 1 has a plurality of properties, including the field name, the background color for the field, whether the field is enabled or disabled, the length of the field, and the data type for the field (which in this case is MaxValue). Of course, the field can have a plurality of additional properties as well. Metadata structure 500 is stored in a metadata store.

In order to customize a metadata structure 500, the customizer inputs the customization specification through customizer interface 224. This causes code to be included in MetadataTarget entity 248 that will apply customizations in certain contexts.

In an embodiment of the present invention, customization of all types of metadata in data structure 500 is achieved by using deltas. A delta represents a change in the metadata structure 500 from its original form. A customization can contain any number, n, of deltas, each delta representing a specific change relative to a known instance of a base target. Further, the delta need not simply represent a change to an existing node. Instead, the delta can represent the addition of a new node in the metadata structure 500.

As an example of changing a value, in the original data structure 500, the background color for the field having a name "foo" is yellow. Assume that a customizer wishes to change the background color to blue. In that instance, the customizer will have made a single customization containing a single delta. The customization is relative to the field "foo" under Tab 1 of the Customer_Maintenance_Screen. The customization can be stored in a separate part of the metadata store or in a metadata customization entity 502 which is mapped to the relational database 204. A table in relational database 204 that can form a part of the metadata store is illustrated by table 504 which contains a metadata ID identifying the background color property of field 1 under tab 1 of the fields in the Customer_Maintenance_Screen portion of the Forms. Table 504 also includes delta information which identifies the delta, that being that the background color of the field is changed to blue. Thus, the delta is not a copy of the source that has been modified. Instead, it is only a specification of which value in structure 500 should be modified. By only tracking deltas, it is possible for many modifications to be dynamically applied to a target.

In order to apply the deltas, the customization-enabled subsystem 226 calls adapter 234 to apply customizations through MetadataAdapter 238. MetadataAdapter 238 calls Apply( ) on MetadataTarget 248 to apply customizations in the present context. For instance, assume that customization-enabled subsystem 226 is the Form loading subsystem. Further assume that a user has requested the Customer_Maintenance_Screen to be displayed. Of course, Metadata-Adapter 238 then identifies all MetadataTarget instances in the relational database that apply to the current context for the form named Customer_Maintenance_Screen. The MetadataAdapter 238 then calls MetadataTarget.Apply( ) on MetadataTarget 248 for each instance identified to apply the customizations. It can be seen that the customization to be applied to the metadata requires that the background color of Field 1 under Tab 1 of the Customer_Maintenance_Screen be changed to blue. The code in the MetadataTarget 248 makes this change and the customized portion structure 500 is passed back to the customization enabled form loader 226 for use in rendering the screen.

In accordance with one embodiment, the present invention also includes a mechanism to resolve conflicts where multiple deltas from different customizations reference the same property. For example, assume that a manager had customized the background color for the given Field 1 under Tab 1 of the Customer_Maintenance_Screen to be orange. Further assume that an employee had a personal preference customization changing the background color to blue. These two separate customizations both apply to the individual user. The individual user is part of the department for which the customization to orange has been made, but the individual user has, himself, made a customization to blue. These two customization instances are therefore in conflict. Both customizations are attempting to set the background color for the same field to a different color. However, a field can have only one setting for values such as color. Therefore, one customization must prevail, and the other must not.

In accordance with one embodiment of the present invention, customization conflicts are resolved using conflict resolution policies. Such policies are illustratively stored in a table which identifies a certain policy that applies to each of the different data types in metadata structure 500. A portion of such a table is illustrated as table 510 in FIG. 7B. Of course, table 510 is exemplary only. Table 510 includes a data type field identifying data types in structure 500 and a policy field indicating the conflict resolution policy to be applied. In one illustrative embodiment, the conflict resolution policies include the following:

1. Most restrictive value;
2. Narrowest context;
3. Set once values;
4. Additive; and
5. Administrative override.

The most restrictive policy can be used for enumerations. For example, if one customization indicates that values A–E are valid and another indicates that values C–F are valid, then only values C, D, and E are valid because that is a most restrictive combination of the two conflicting customizations. This policy can also be used for numeric fields. For example, if the data type is a maximum value data type and two customizations attempt to set a number to two different values, then the minimum value is the most restrictive and prevails. If the data type is a minimum value data type, then the maximum value is most restrictive and prevails.

The narrowest context policy resolves conflicts in favor of the customization that is associated with the narrowest context. For example, a customization targeted at a single user would win over a conflicting customization with a corresponding context set to all users.

The set once values policy resolves conflicts such that a value can only be set once. It cannot thereafter be changed.

The additive policy applies to data types such as field groups (or groups of fields that will show up on a screen). A field can illustratively belong to multiple groups. Therefore, if one customization adds a field to a first group and another customization adds the same field to a second group, then the conflict is resolved by adding the field to both groups.

A final conflict resolution policy is administrative override. This allows an administrator to override conflict resolution policies on an item-by-item basis.

Of course, the conflict resolution policies are illustrative only and other or different policies can be used, as desired.

Figure 8A:
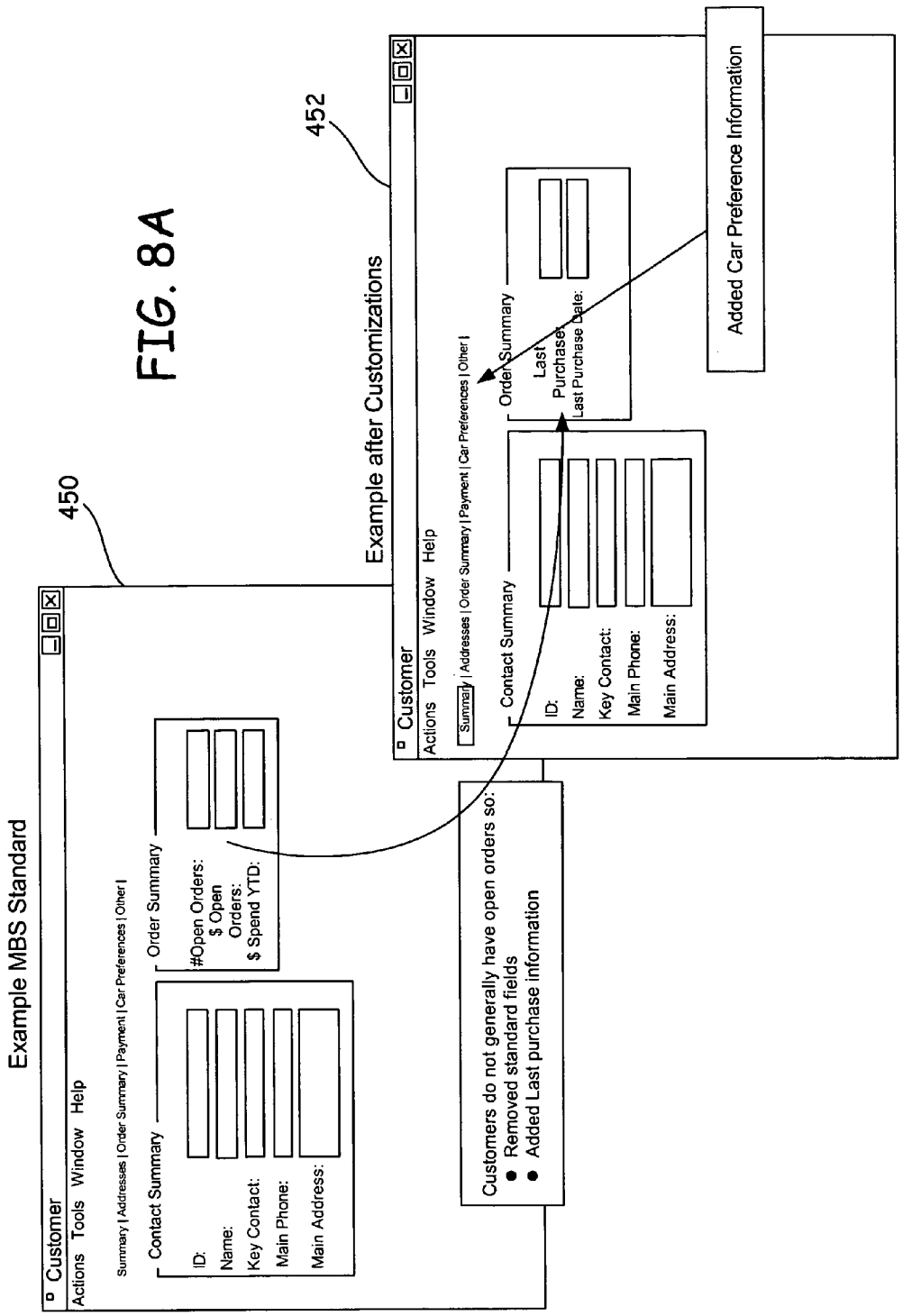
Figure 8B:
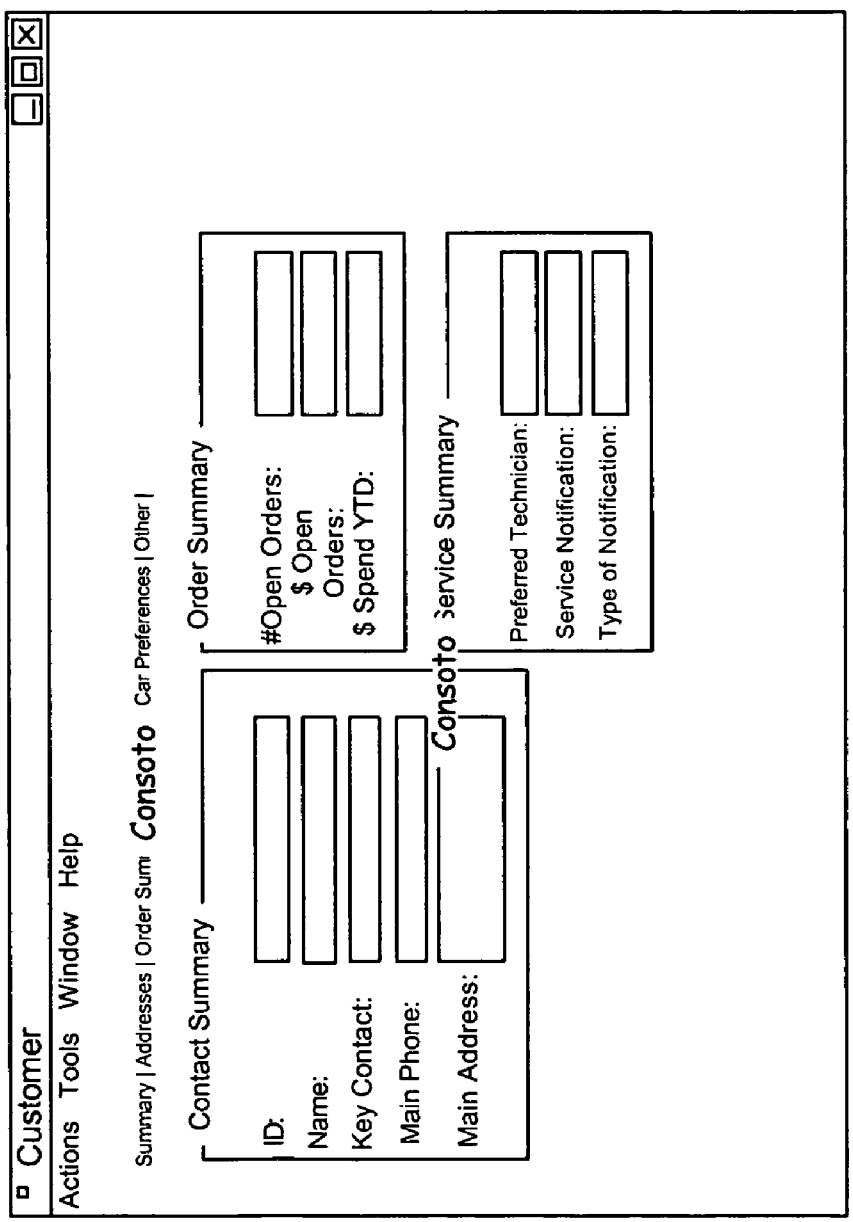

FIGS. 8A–8C illustrate an even more concrete example of how customizations can be performed through entity extension. In the example illustrated in FIGS. 8A–8C assume that a car dealership Mortens Autos purchases a financial software package. After installation and running of the package, Mortens Autos customizes the product to add fields to track each customer car preferences (such as color, engine, make/model, etc.). Assume that Mortens Autos also adds new fields to a customer screen for the customer car preferences, and removes a number of unused fields.

FIG. 8A illustrates a screen shot 450 of a standard customer screen displayed by the financial package purchased by Mortens Autos. It can be seen that screen 450 includes order summary fields which are not generally used in the car dealer industry. FIG. 8A also shows the same customer screen after the customizations have been implemented. The original order summary fields have been replaced with fields indicating the customer's last purchase and last purchase date. In addition, a car preferences tab has been added to display the customer's car preferences. This is all accomplished simply by extending entities and metadata as discussed above.

Next, assume that another solutions provider, Consoto, introduces electronic mail notifications for service reminders. Assume further that the customer entity provided by Consoto also adds a string to the customer entity for the name of the customer's favorite technician and a text box for a new field to the customer screen. An example of Consoto's customer screen is illustrated in FIG. 8B. Assume that Mortens Autos buys, from Consoto, a software package to run the service department.

After the installation, all previous customizations still work without manual intervention or rework. This is shown in FIG. 8C. For instance, the customer's car preferences field is shown on the screen and the original Order fields are removed from the screen. Similarly, Consoto's changes to the customer screen are also provided. Specifically, the new fields on the customer entity and text boxes on the customer screen are included. As is described above, when the new software package is installed, the customization subsystem framework is called and the customizations are installed and applied, automatically, without user intervention.

Customization of Processes

Processes typically include work flow specifications that route work through a defined set of steps, as well as lower level processing logic that executes well defined actions on a piece of data. Processes are referred to herein as business activities which can be long running business processes.

Figure 9:
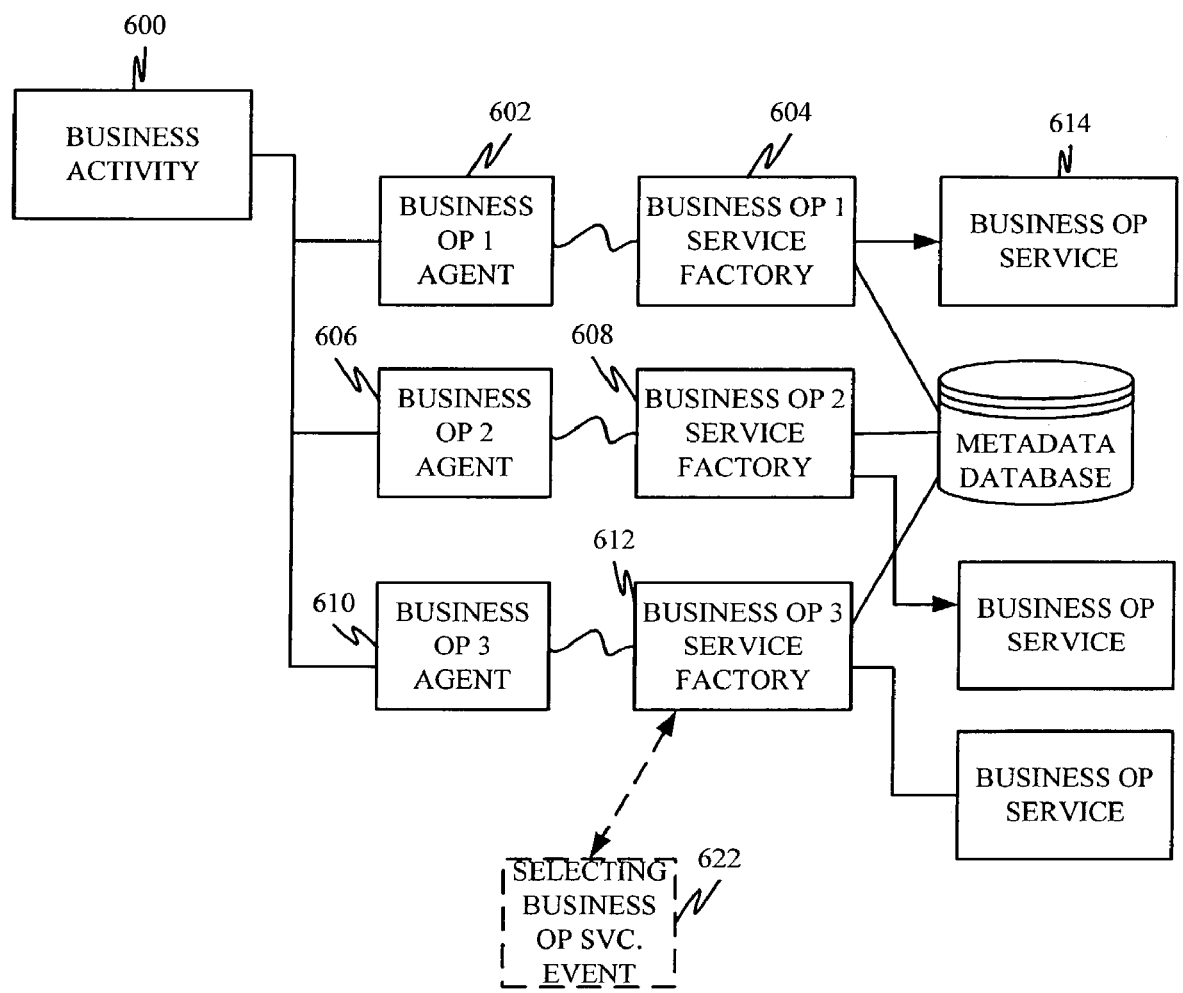
FIG. 9 is a block diagram of one embodiment of a representation of a business activity.

FIG. 9 further illustrates how a business activity 600 can be implemented. In one embodiment, the business activity 600 is broken into a plurality of individual transactional steps referred to as business operations. Each of the business operations that make up a business activity can be categorized into one of two different types of operations. The first is referred to herein as a planned operation replacement. In other words, when the original application developer plans on logic replacement, the application is written such that it selects the specific logic to execute at run time. In this way, third party developers may extend the type of processing that is done. The original author develops a "plug point" and one or more default implementations. Third party developers can then create and install additional implementations. The application typically provides storage in the application database for the selection of which business operation to execute in a given instance. An example of such logic is a sales commission calculation engine. The original author may build commission selection information into the SalesPerson entity, and might also supply a "fixed percentage" default. Of course, third party developers might create and install more sophisticated calculators.

A second type of business operation is referred to herein as an adhoc operation replacement. For instance, there are times when the original author does not plan on an operation being replaced. Therefore, the author may not build any special logic into the application to select an alternative implementation. However, a vendor may still need to replace the original operation with logic of its own. In order for the vendor operation to be called instead of the original operation, a framework mechanism is provided to modify selection logic.

Before describing these mechanisms in further detail, another concept should first be described. Business operations in accordance with one embodiment of the present invention, follow an agent-service pattern. A business operation agent is the only part of the process that a client directly interacts with. A client that needs to run the business process creates an instance of a business operation agent and sends it properties to provide its required inputs. In turn, the agent locates a corresponding service class (through a service factory), instantiates it, and calls it to actually perform the work that implements the service.

In either of the replacement scenarios mentioned above, the agent itself is not replaced. The client always creates and calls the same original business operation agent. This ensures that the client is always able to call the agent because it will have a stable interface. Business operation agents are entities and can have extension entities associated with them which can have additional properties added to them. This provides agent extensibility without breaking the original agent interface contract. The agent may locate the correct service to run in a number of different ways.

FIG. 9 further illustrates that business activity 600 is implemented using three business operations, operations 1, 2, and 3. Business operation 1 has an agent 602 and a business operation service factory 604. Business operation 2 also has an agent 606 and a service factory 608. Business operation 3 also has an agent 610 and a business operation service factory 612.

For planned replacement, the calling application (or client) passes a service ID into the agent currently being called. The service ID indicates which service to activate. Thus, if the caller passes agent 602 a specific service ID, agent 602 identifies, through service factory 604, the business operations service 614, instantiates it, and calls it to perform the operation. Simply by passing in a different Service ID, the service can be changed.

Figure 10:
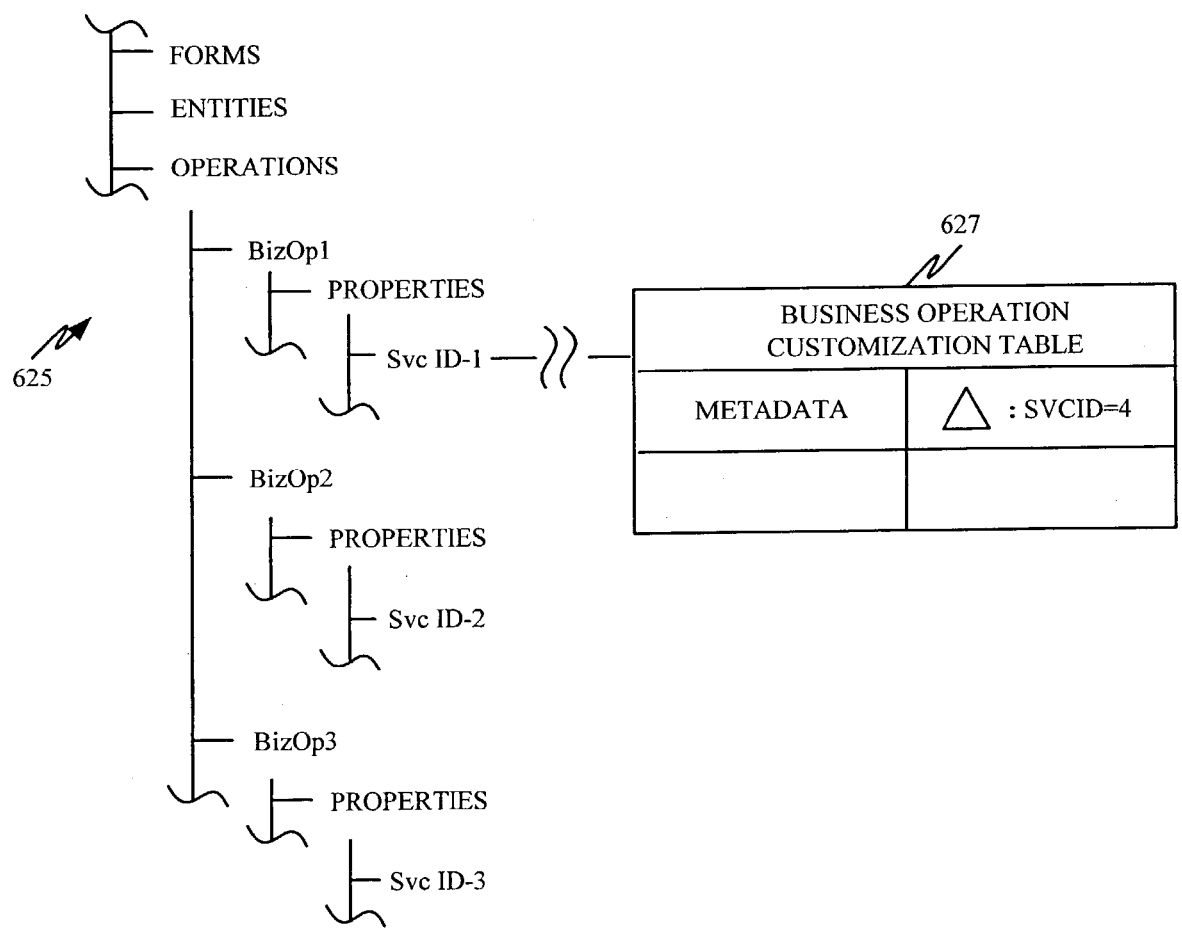
FIG. 10 illustrates one embodiment of customization of a business activity through metadata customization.

For an adhoc replacement, there are two different methods that can illustratively be used in order to override the built-in selection of the business operation service. For example, assume that business operation 3 is to be replaced. In one embodiment, the service ID is stored in a metadata structure, such as that shown in FIG. 10. FIG. 10 illustrates a portion of a metadata structure 625 which includes an item of metadata referred to as Operations. The Operations include three business operations, each of which includes a plurality of properties, one of which is the service ID. In that instance, the vendor can simply customize the portion of metadata which holds the service ID for the business operation to be overridden.

For example, assume that the service ID for business operation 1 is customized to instead be the service ID for a business operation number 4. FIG. 10 shows a table 627 referred to as the business operation customization table which includes a metadata identifier (the identifier for the service ID entry in the metadata structure) and the delta which shows the customization of the service ID to the number 4. When the customizations are applied to this process, the service ID number 1 will be replaced with the customized service ID number 4. This will be handed to the business operation service factory being used and it will instantiate and call business operation service number 4. The agent will not pass any service ID to its factory, and the factory will then proceed normally to look up the associated default service ID in the metadata store. This will retrieve the customized service ID and the factory will instantiate the replacement business operations service instead of the originally designated service.

Another method to implement adhoc replacement customization is also illustrated in FIG. 9. In that embodiment, the particular service factory being utilized propagates an event. The vendor who wishes to customize the service operation can subscribe to this event and place logic in an associated event handler to alter the value of the service ID. This method not only allows customization of the business operation, but allows dynamic service selection based upon data contained in the business operation agent. For example, as shown in FIG. 9, business operation service factory 612 can propagate an event 622 when agent 610 calls factory 612 to instantiate a business operation service. The custom logic added to the associated event handler can alter the value of the service ID and pass it back to factory 612. If the custom event code does not choose to set the service ID, the default (and potentially customized) value of the service ID is read from the metadata storage.

Dependencies

It is also worth noting that one embodiment of the present invention enforces customization dependencies. In other words, if one vendor or manufacturer customizes and ships a product and the user further customizes the product, customizations of items of data may depend on previous customizations of the same data. Thus, the base class of the customization framework maintains a list of what customizations are dependent on which other customizations. If a customizer wishes to create or remove a customization, the base Adapter class first determines whether other customizations depend on it. Each customization thus has an associated dependency list. In the adapter system, a method is called to enforce dependencies that will make certain that the customizer has affirmatively dealt with all dependencies prior to making customizations.

Although the present invention has been described with reference to particular embodiments, workers skilled in the art will recognize that changes may be made in form and detail without departing from the spirit and scope of the invention.

What is claimed is:

1. A customization framework for customizing computer implemented software systems, comprising:
    an adapter subsystem having methods configured to be invoked to receive a customization input from a customizable subsystem outside of the customization framework, the customization input indicative of a requested customization; and
    a target subsystem having a method configured to be invoked by the adapter subsystem to apply the requested customization to the customizable subsystem.

2. The customization framework of claim 1 wherein the adapter is configured to identify entities to be customized.

3. The customization framework of claim 2 and further comprising:
    a context component configured to identify a context in which each requested customization is to be applied.

4. The customization framework of claim 3 wherein the adapter subsystem is configured to identify portions of the customizable subsystem to customize based on the context.

5. The customization framework of claim 2 wherein the target subsystem has a method configured to be called by the adapter subsystem to apply the requested customization to the identified entities.

6. The customization framework of claim 1 wherein the adapter subsystem includes a method configured to be called by the customizable subsystem to perform general customization of operations on the customizable subsystems.

7. A computer readable medium storing instructions causing a computer to perform steps of:
    providing an adapter subsystem;
    providing a target subsystem;
    receiving a customization input indicative of a customization to be made to portions of a customizable subsystem;
    receiving at the adapter subsystem a request from the customizable subsystem for the portion; and
    identifying, with the adapter subsystem, the portion of the customizable subsystem to be customized.

8. The computer readable medium of claim 7 and further including instructions to perform a step of:
    calling the target subsystem to apply the customization to the portion to be customized.

9. The computer readable medium of claim 8 and further comprising:
    accessing a context component with the adapter subsystem to obtain a current context.

10. The computer readable medium of claim 9 wherein identifying comprises:
    identifying the portion to be customized based on the current context.

11. The computer readable medium of claim 10 wherein calling the target subsystem comprises:
    calling the target subsystem to apply the customization to the portion, given the current context.

12. The computer readable medium of claim 11 wherein the portion to be customized comprises an entity and further comprising:
    customizing the entity with the target subsystem.

13. The computer readable medium of claim 11 wherein the portion to be customized comprises metadata and further comprising:
    customizing the metadata with the target subsystem.

14. The computer readable medium of claim 11 wherein the portion to be customized comprises a process and further comprises:
    customizing the process with the target subsystem.

15. The computer readable medium of claim 11 wherein the portion to be customized comprises event code, and further comprising:
    customizing the event code with the target subsystem.

16. The computer readable medium of claim 8 wherein calling the target subsystem to apply the customization comprises:
    modifying information already existing in the portion to be customized.

17. The computer readable medium of claim 8 wherein calling the target subsystem to apply the customization comprises:
    adding information to the portion to be customized.

18. A customization framework for customizing computer implemented software systems, comprising:
    a design component configured to receive a customization input indicative of a customization to be made to a customizable subsystem; and
    a runtime component configured to receive a request from the customizable subsystem and apply the customization to the customizable subsystem.

19. The customization framework of claim 18 and further comprising:
    a context component configured to receive a context associated with the customization input.

20. The customization framework of claim 19 wherein the context component is configured to output a context associated with the request.

21. The customization framework of claim 20 wherein the runtime component comprises:
    an adapter subsystem configured to obtain the context output by the context component and identify a portion of the customizable subsystem to be customized based on the context and the request.

22. The customization framework of claim 21 wherein the runtime component comprises:
    a target component having a method configured to be invoked by the adapter subsystem to apply the customization to the identified portion of the customizable subsystem.

* * * * *